United States Patent [19]

Raupp et al.

[11] Patent Number: 5,045,288
[45] Date of Patent: Sep. 3, 1991

[54] GAS-SOLID PHOTOCATALYTIC OXIDATION OF ENVIRONMENTAL POLLUTANTS

[75] Inventors: Gregory B. Raupp, Chandler; Lynette A. Dibble, Tempe, both of Ariz.

[73] Assignee: Arizona Board of Regents, a body Corporate, acting on behalf of Arizona State University, Tempe, Ariz.

[21] Appl. No.: 407,573

[22] Filed: Sep. 15, 1989

[51] Int. Cl.$^5$ .......................... B01J 19/08; B01J 19/12
[52] U.S. Cl. ............................. 422/186.3; 204/157.15; 204/157.3; 204/157.41; 204/157.5; 423/240
[58] Field of Search ................. 422/186.3; 204/157.15, 204/157.3, 157.44, 157.41, 157.42, 157.5, 157.51, 157.21, 157.22; 423/240 S

[56] References Cited

U.S. PATENT DOCUMENTS

3,924,246 12/1975 Scherer .................................. 365/94
4,544,470 10/1985 Hetrick ............................. 204/157.5
4,774,026 9/1988 Kitamori et al. ................ 204/157.44

*Primary Examiner*—Deborah L. Kyle
*Assistant Examiner*—J. Woodrow Eldred
*Attorney, Agent, or Firm*—Richard R. Mybeck

[57] ABSTRACT

Means and methods employing gas-solid heterogenous photocatalysis ("GSHP") to counteract the widespread occurrence of groundwater and air polluted by volatile organic compounds (VOCs) such as trichloroethylene (TCE) and non-volatile organic compounds such as polychlorinated biphenyls (PCBs), and the like without creating other environmentally hostile agents. Common treatment methods such as spray tower aeration and activated carbon adsorption, both of which merely convert pollutants into alternate but equally obnoxious forms, can be augmented by the means and methods hereof to create ecologically innocuous byproducts. Heterogeneous photocatalysis allows the complete destruction of those organic water pollutants normally contained in the effluents of existing water treatment facilities. Ambient temperature ultraviolet-illuminated catalyst, such as, titanium dioxide, in the presence of moist air substantially completely destroys trichloroethylene (TCE) type-materials in a gaseous phase.

21 Claims, 6 Drawing Sheets

GAS-SOLID PHOTOCATALYTIC OXIDATION OF ENVIRONMENTAL POLLUTANTS

INTRODUCTION

The present invention relates generally to gas-solid photocatalytic oxidation of environmental pollutants and more particularly to means and methods of removing toxic and environmentally hostile substances from available supplies of water and air in a manner which produces wholesome water and/or air and environmentally innocuous waste byproducts.

BACKGROUND OF THE INVENTION

The future availability of groundwater as a source of potable water is being jeopardized by the widespread occurrence of organic contaminants in groundwater supplies. A variety of pollutants have been detected, but none occur more frequently or at higher concentrations than trichloroethylene (TCE), a volatile organic compound (VOC) classified as a probable human carcinogen (Dyksen and Hess 1982). Remedial strategies now in widespread use for treating VOC-polluted groundwaters do not destroy contaminants during treatment, but instead merely shift the pollutants to another medium. For example, aeration produces contaminated air streams which are usually vented directly to the atmosphere, while activated carbon adsorption produces hazardous solid wastes. Efforts to manage polluted groundwater through well abandonment and blending contaminated water with clean water to meet standards are not viable long term options in a water limited environment, where all available resources must be utilized fully.

Heterogeneous photocatalysis shows promise as a chemical method that is capable of the complete, room temperature oxidation of volatile organic compounds such as TCE to environmentally innocuous species. In their pioneering work, Pruden and Ollis (1983) demonstrated the complete mineralization of dilute (10–50 ppm) aqueous solutions of TCE to carbon dioxide and hydrogen chloride by irradiating a 0.1 wt. % slurry of titanium dioxide with commercial black lights according to the following reaction:

$$Cl_2C=CClH + H_2O + 3/2\, O_2 \rightarrow 2\, CO_2 + 3\, HCl$$

A key disadvantage to the aqueous phase photocatalytic process arises from the fact that the treated water is not suitable for human consumption because of the slurry of sub-micron sized titanium dioxide particles that remains after the reaction is complete. Indeed, the recovery of potable water from water treated by aqueous phase photocatalytic requires capital and energy intensive centrifugation or ultrafiltration.

BRIEF SUMMARY OF THE INVENTION

The present invention provides novel means and methods for removing harmful groundwater pollutants of volatile and non-volatile organic compounds such as trichloroethylene (TCE), polychlorinated biphenyls (PCBs) and the like, and destroying the pollutants or otherwise converting them into environmentally innocuous species. The present invention achieves this socially needed objective by the unique application of gas-solid heterogeneous photocatalytic oxidation to the removal of such pollutants from heretofore unusable groundwater and converting that groundwater to useful potable water inventories without producing alternative form environmental hazards.

This great human benefit is realized by processing polluted water supplies with ultraviolet illuminated titanium dioxide in combination with a fluidized bed photo reactor formed of optical quality glass (boro-silicate), quartz or like substances which are transparent to light waves having a wave length of less than 450 nanometers (ultraviolet).

Gas-solid photocatalytic oxidation with UV-illuminated titanium dioxide has been found to overcome the separation problem inherent in prior aqueous work by utilizing a solid catalyst to achieve the destruction of TCE contained in a gas-phase carrier stream typical of the effluent produced by water treatment facilities. As will hereinafter appear in detail, this unique methodology results in the complete destruction of volatile organic water pollutants, and overcomes the previously inherent requirement to accept those pollutants in the environment as contaminated air streams or spent carbon beds.

Accordingly, a principal object of the present invention is to provide improved means and methods for removing toxic and environmentally hostile substances from available supplies of water and air to create wholesome water and/or air and environmentally innocuous byproducts.

Another object of the present invention is to provide means and methods of efficiently and effectively removing unwanted organic compounds from water sources to produce potable water therefrom without contaminating either the atmosphere or solid waste repositories with the byproducts thereof.

These and still further objects as shall hereinafter appear are fulfilled by the present invention in a remarkably unexpected fashion as will be readily discerned from a careful reading of the following detailed description of preferred embodiments thereof, especially when read in conjunction with the accompanying drawing in which like parts bear like indicia throughout the several views.

DESCRIPTION OF PREFERRED EMBODIMENTS

The present invention described and claimed herein relates to means and methods of removing toxic and environmentally hostile substances from available supplies of water and air, especially from polluted groundwater, in a manner which not only produces wholesome water and/or air but creates environmentally innocuous waste byproducts. As will appear, the technology hereof is equally applicable to the purification of polluted groundwater as well as air which has been polluted by emissions from solvent-based cleaning operation such as are found in the tool and die, electronics and like manufacturing industries. For purposes of this disclosure, the water table will be referenced to exemplify rather than limit the technology.

The major advantage of photocatalysis employed in the present invention is that chemical transformations, which would be difficult or expensive using traditional thermal methods, can be accomplished under relatively mild conditions. The energy requirement for photocatalytic reactions is supplied by direct absorption of light, rather than by heating. Titanium dioxide is a metal oxide semiconductor with a band gap of 3.0–3.2 eV, corresponding to light energy in the near ultraviolet region of the spectrum. The mechanism by which near-UV illuminated catalyst, such as titanium dioxide, effects the oxidation of TCE and other organic pollutants, is believed to arise when the electrons and holes (produced by the absorption of UV light by the solid catalyst) bind with species adsorbed on the catalyst surface to produce hydroxyl radicals (OH) which in turn are highly reactive and capable of attacking adsorbed organic molecules. As will appear herein, the gas-solid TCE degradation employing present invention demonstrates that the photocatalytic oxidation of TCE type materials is a surface reaction, and that the aqueous phase used by the prior art is not a necessary matrix for the transport of scavenging reactive species.

Figure 1:
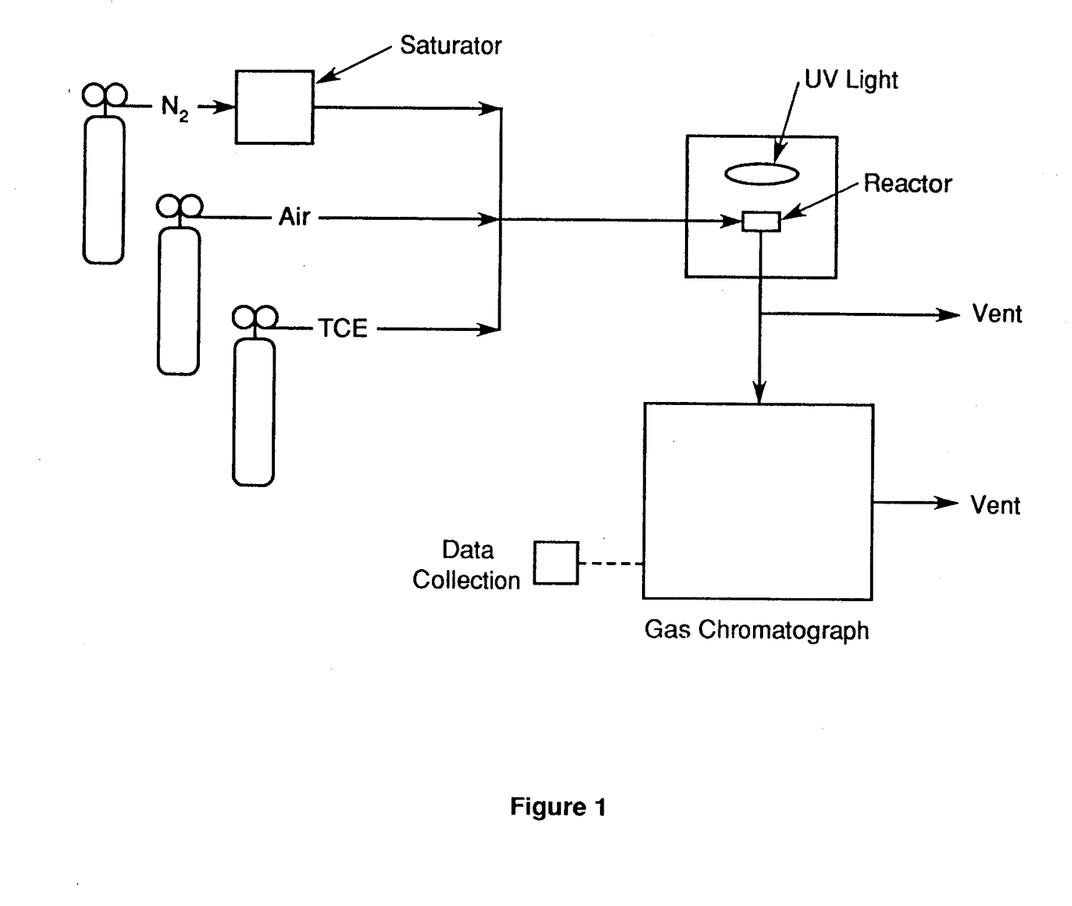
FIG. 1 is a schematic diagram of experimental apparatus embodying the present invention.

In one practice of the present invention, reagent grade titanium dioxide (anatase) powder (Aldrich Chemical Co.) was used without further purification. Analyzed gas cylinders of 10.7 ppm (Liquid Air Corp.) and 474 ppm (Matheson, Inc.) trichloroethylene in nitrogen were used to prepare TCE feed streams of various concentrations. A 75 watt commercial incandescent "black light" bulb with output primarily in the near-UV or UV A, (320–440 nm) was used as a typical ultraviolet source. This working range minimizes the possibility of undesirable homogeneous reactions, which can occur at wavelengths below 300 nm (Calvert and Pitts 1966). A schematic of the experimental apparatus is shown in FIG. 1 wherein reactants (TCE, air, nitrogen) flow from pressurized gas cylinders to the reaction system. Water vapor can be added to the system by passing nitrogen through a saturator; the degree of saturation is determined by the contact time and the temperature in the saturator. Reactant flow rates are controlled by mass flow controllers (Tylan Corp.). After mixing, the gases are fed to the reactor/illumination system which is contained in a light-tight box to shield the reactor from any extraneous background light. Reaction products and the reactant feed are analyzed with a gas chromatograph (Varian 3700) equipped with flame ionization and electron capture detectors. All reactant lines are heated to ensure no adsorption of vapor takes place within the gas transport system.

Figure 2:
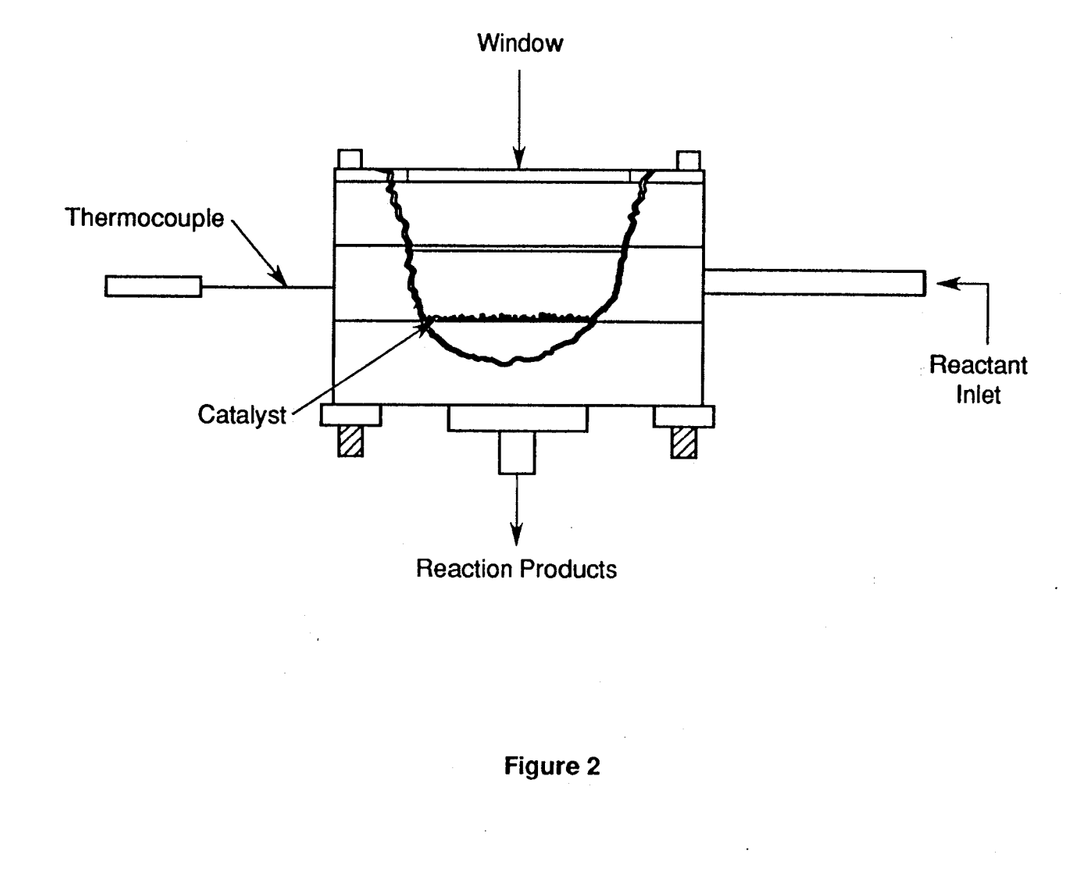
FIG. 2 is a schematic diagram of a fixed bed reactor embodying the present invention.

The reaction takes place in a fixed bed reactor, as shown schematically in FIG. 2. The reactor body is constructed of 304 stainless steel and the window is constructed of 7056 glass which allows near ultraviolet and visible light to illuminate the catalyst bed. A small amount of catalyst (ca. 20 mg) is supported on a filter located in the center of the reaction chamber, which has a volume of 2.5 cubic centimeters. The reactor temperature is measured by a type J thermocouple equipped with a digital readout (Omega Engineering). The system is flushed continuously with purified nitrogen for several hours prior to operation. Reactant flows are started at pre-set levels. When steady-state conditions are achieved, the UV source is activated and reactor effluent samples are analyzed at approximately five minute intervals by a manually-activated sampling valve (Valco, Inc.) located within the gas chromatograph. The data is in the form of chromatographic peaks, with the peak height proportional to the concentration of the solute and the peak area proportional to the total amount of solute present. After steady-state conditions are again achieved, the light source is deactivated and sampling is continued until the signal from the gas chromatograph indicates that pre-reaction conditions have been reestablished. Various concentrations of TCE were sampled from the gas delivery system to construct a calibration curve for determination of reactant conversion.

Figure 3:
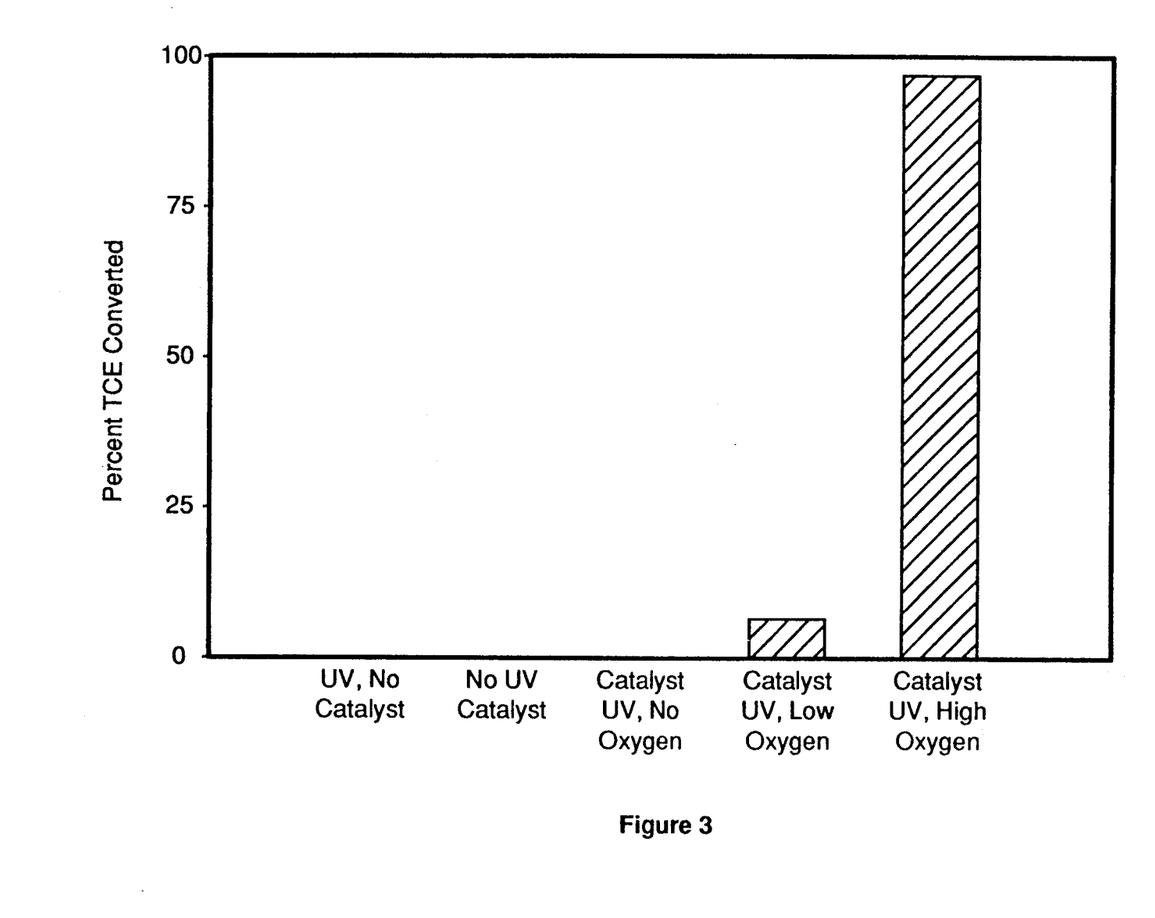
FIG. 3 is a bar graph illustrating the percent TCE converted in a fixed bed reactor with: (a) UV with no catalyst; (b) no UV with catalyst; (c) catalyst plus UV with no oxygen; (d) catalyst plus UV at low oxygen; and (e) catalyst plus UV at high oxygen.

In the presence of air, titanium dioxide catalyst, and near-UV illumination, rapid oxidation of TCE occurs with no sign of reaction byproducts. High conversions of gas streams containing TCE ranging from 50 ppb to 474 ppm have been accomplished. To verify that the conversion of TCE was the result of heterogeneous photocatalytic oxidation, several control experiments were run. The results are shown in FIG. 3. For UV-illuminated, catalyst free systems containing TCE and excess oxygen, no reaction was observed. Likewise, no reaction took place in catalyst-containing systems illuminated by visible light. In the absence of oxygen, no change was seen in the TCE signal, while in oxygen deficient systems, very little conversion of reactants took place. After several hours of operation, however, additional chromatographic peaks, corresponding to yet unidentified species, were observed. Upon addition of oxygen to the reactor, these peaks disappeared, suggesting that the unknown species were partial oxidation products formed from the TCE reactant Over 98% conversion of the TCE reactant was observed at a feed concentration of 10 ppm in excess oxygen using a 44.1 mg. catalyst bed and a feed rate of 1.5 cc/min. At 50 ppm, over 97% conversion was obtained, while 94% conversion of a 300 ppm feed of TCE (at feed rates of 1.5-2 cc/min) was achieved with a 22.6 mg catalyst bed. The titanium dioxide catalysts appear to have extremely long lifetimes because in several weeks of operation, no decrease in catalyst activity was observed.

From the foregoing it is apparent that the means and methods of achieving gas-solid photocatalytic oxidation of water pollutants has been described which is useful as a simple, relatively inexpensive method to achieve the complete removal of volatile organic water pollutants from the environment. Because light energy is utilized to break chemical bonds directly, and the reaction takes place at room temperature, the process is not energy intensive. Other water treatment schemes that utilize ultraviolet light to catalyze reactions such as UV/ozonation require radiation in the mid-to-far range that is, wavelengths less than 256 nm), whereas the illuminated titanium dioxide scheme of the present disclosure requires only near-UV light, that is, wavelengths from about 350 to less than 450 nm, which results in substantially lower light energy costs.

Figure 4:
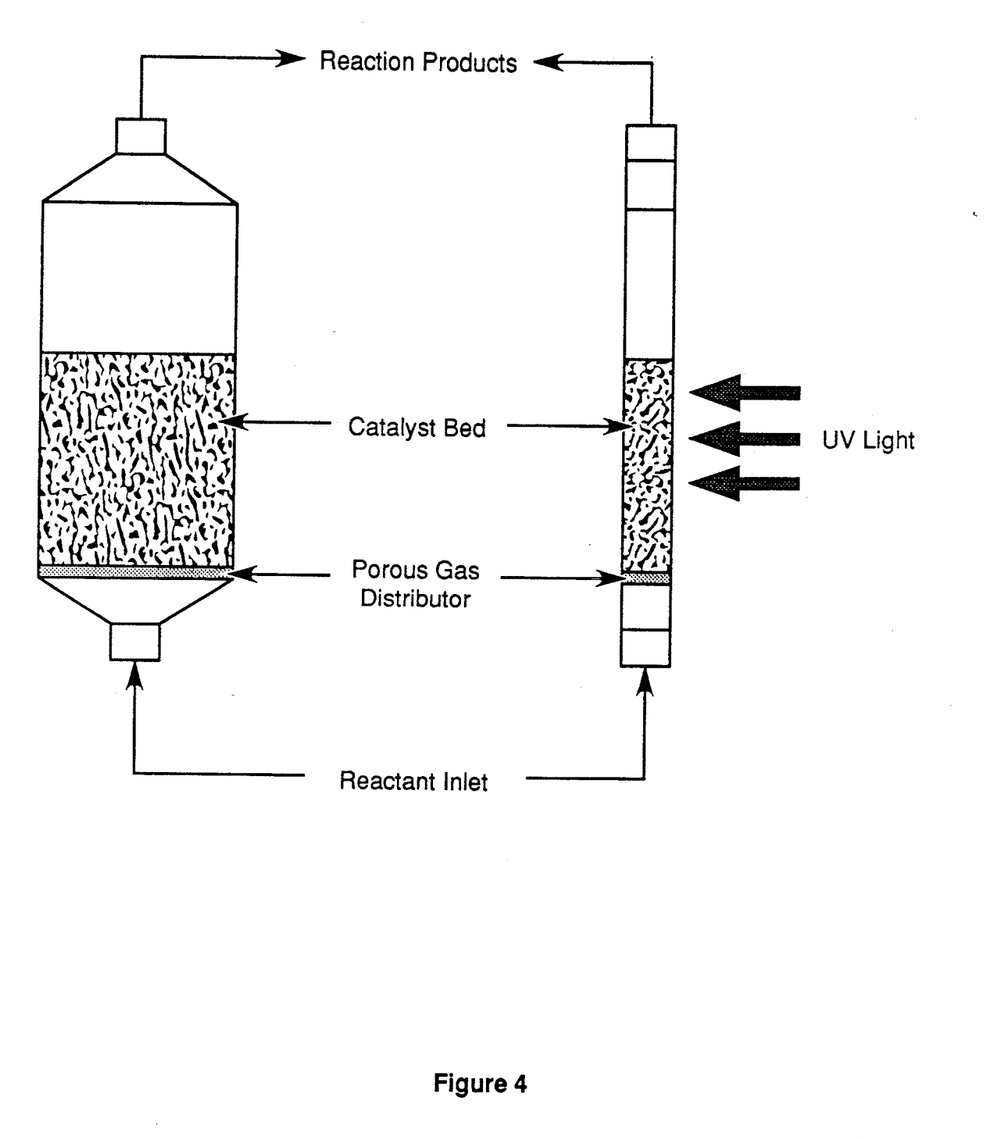
FIG. 4 is a schematic diagram of a flat plate fluidized bed reactor useful in the practice of the present invention.

In upscaling the laboratory scale model of this process into a large-scale water treatment facility, the problem of simultaneously contacting TCE and other VOCs with the relatively large amounts of catalyst and light needed to successfully treat large volumes of contaminated airstreams was resolved employing a "flat plate" fluidized bed reactor such as is shown schematically in FIG. 4. The flat plate configuration, ensures that at any given instant of time, a large fraction of the catalyst particles will be exposed to the UV light. In this scheme, the upward flow of gaseous reactants counters the force of gravity and the particles tumble about freely as if the catalyst bed is "liquefied". Such a reactor is especially suited to this photocatalytic process, in which exposure of the catalyst surface to the exciting radiation is required for reaction.

Figure 5:
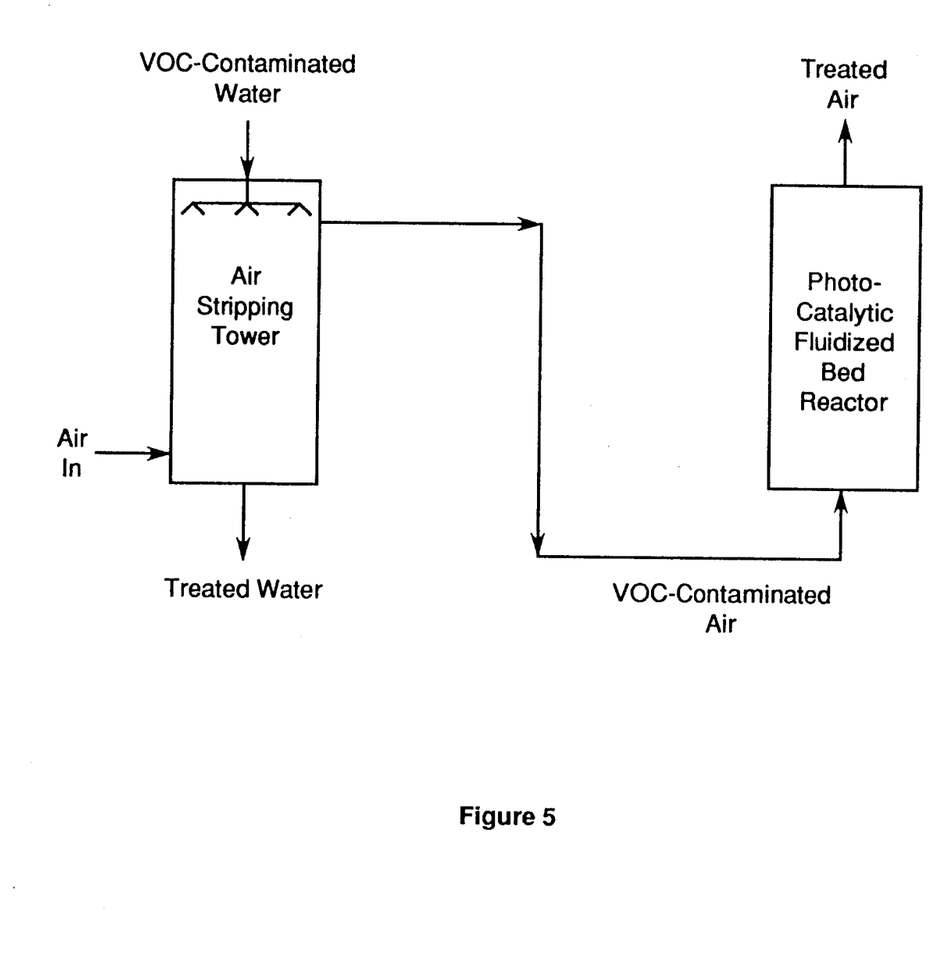
FIG. 5 is a schematic diagram of the gas-solid photo catalyst oxidation reactor hereof in series with an air stripping tower.
Figure 6:
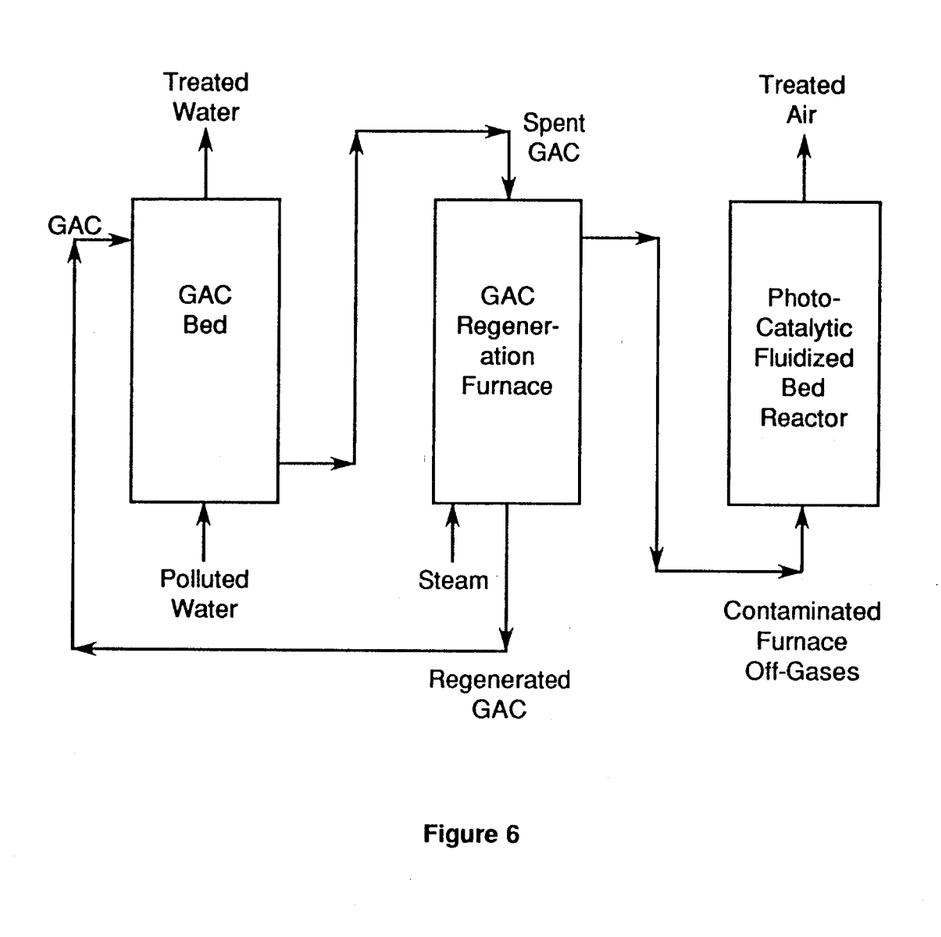
FIG. 6 is a schematic diagram of the gas-solid photo catalyst oxidation reactor in series with an activated charcoal bed and charcoal regeneration furnace.

While the gas-solid heterogeneous photocatalytic oxidation of water pollutants has been illustrated herein with respect to trichloroethylene, it is believed to be also suitable for the complete removal of such pollutants as volatile and non-volatile chlorinated organic compounds including chloroform, dichloromethane, PCBs, phosphates as well as the partial oxidation of paraffins, olefins and alcohols which substantiates the potential for this process to degrade nonchlorinated organic pollutants. Moreover, the gas-solid photocatalytic oxidation system of the present invention can be readily integrated into and with existing water treatment facilities. Thus, in the treatment of VOC-contaminated water, reactors embodying the present invention can be installed downstream of a spray or packed tower aeration unit as shown in FIG. 5, or, as shown in FIG. 6, the gas-solid photocatalytic oxidation system can be integrated with a dual carbon bed system for use in the destruction of non-volatile organic contaminants restrained therein. Note that water pollutants adsorbed in activated carbon beds are usually driven off during the regeneration of the bed so that by placing the gas-solid photocatalytic reactor in line after the regeneration unit, the regeneration off-gases can be cleaned before they are released to the environment.

As shown above, gas-solid heterogeneous photocatalysis using ultraviolet-illuminated titanium dioxide rapidly destroys trichloroethylene over a wide range of concentrations and is capable to convert other VOC compounds and non-volatile organic water pollutants into environmentally-innocuous species. It is also shown that the gas-solid heterogeneous photocatalytic system hereof can be readily integrated into existing water treatment facilities without incurring a significant capital outlay.

It is the semiconductor nature of titanium dioxide that allows the absorption of ultraviolet light by the solid to result in the oxidation of surface-adsorbed species, in this case trichloroethylene. This reaction can be referred to as gas-solid heterogeneous, photocatalysis, gas-solid photocatalysis or heterogeneous photocatalysis. Photocatalysis may also be referred to as photoassisted catalysis. Absorption of light wavelengths less than 450 nm will produce the electron/hole pairs in the catalyst that actually take part in the reaction. Light at wavelengths less than 300 nm will excite the catalyst, but may also result in homogeneous reactions (in the gas phase, independent of the catalyst) as well as heterogeneous reactions. For this reason, it is important to use a UV source emitting light in the UV A region. This provides an additional serendipitous benefit because sources further into the ultraviolet (e.g. UV B) are more expensive and are potentially harmful to humans. Any source producing the required UV wavelengths can be used if it possesses sufficient intensity, for example, on the order of $10^{-7}$ (Einsteins/cm$^2$-sec) preferably of intensity greater than $10^{-5}$ (Einsteins/cm$^2$-sec) This standard includes fluorescent "blacklights", incandescent blacklights, solar energy, xenon lamps, and low and high pressure mercury lamps. Other metal oxide semiconductors that have been shown photochemically active for compound oxidation are: zirconium oxide ($ZrO_2$), antimony oxide ($Sb_2O_4$), zinc oxide (ZnO), stannic oxide ($SnO_2$), cerium oxide ($CeO_2$), tungsten oxide ($WO_3$) and ferric oxide ($Fe_2O_3$).

In addition to the substances identified above, it is believed that the means and methods of the present invention are equally applicable to the oxidation, and hence the ready removal from water source of the following substances: chloroform, dichloromethane, carbon tetrachloride, perchloroethylene, 1,1-dichloroethane, dichloroacetaldehyde, dichloroacetic acid, trichloromethane, 1,2-dichloroethane, monochloracetic acid, trichloroacetic acid, monochlorobenzene, dichlorobenzene, 4-4'-dichlorobiphenyl, 2-2'-dichlorobiphenyl, 2-chlorobiphenyl, 3-chlorobiphenyl, 4-chlorobiphenyl, biphenyl, phenol, benzene, nitrobenzene, aniline, benzoic acid, catechol, resorcinol, hydroquinone, 2-chlorophenol, 3-chlorophenol, 4-chlorophenol, 2,4-dichlorophenol, 2,4,6-trichlorophenol, 2-naphthol, ethylene diamine, fluorotrichloromethane, difluorodichloromethane, dibromomethane, 1,1-dibromomethane, 1,2-dibromomethane, vinyl chloride, vinyl bromide, as well as organic sulfites and cyanides.

In other practices of the present invention, the stream containing the obnoxious species to be oxidized flows into the photoreactor. The photoreactor can be a fixed bed reactor, wherein the stream passes through a thin layer of the catalyst, or a fluidized bed reactor, wherein the catalyst is immobilized on a support material that does not absorb (i.e. is invisible to) the light used to activate the catalyst. Silica ($SiO_2$) gel is the preferred support material.

In the fixed bed (dynamic) photoreactor, the light passes through a window and irradiates a thin layer of the catalyst spread on filter paper. Only those layers of catalyst which are illuminated by light of the correct wavelengths (UV A) will participate in the reaction, so that it is necessary to maximize the catalyst surface which is exposed to the light source. The reactant stream passes over the catalyst bed, through the filter paper the catalyst is sitting on, and exits the reactor to the gas analysis system.

The other reactor is a flat plate fluidized bed reactor constructed of borosilicate glass. The exciting light enters through the reactor walls. This reactor does not have to be constructed of quartz (neither does the window of the fixed bed reactor) because the ultraviolet light used in the reaction is in the UV A rather than the UV B region. As quartz is much more expensive than borosilicate glass, the use of borosilicate glass further enhances the economic attractiveness of the present process. The reactant stream flows with sufficient velocity to fluidize the catalyst/support particles, which in turn allows sufficient contact between light, the reactants and the catalyst for the oxidation to take place. The solid particles are supported at the reactor entrance by a fritted (porous) glass plug, and are prevented from exiting the reactor by a volume expansion in the upper reactor chamber (resulting in particle momentum loss) and a fritted (porous) glass plug in the effluent line.

In the preferred practice of the present invention, the simultaneous presence of oxygen and water vapor is needed for the sustained and complete oxidation of the TCE. Without water vapor, the oxidation rates are initially very high, but then drop off and eventually the catalyst becomes inactive. At high water vapor pressures, reaction rates are significantly degraded. To ensure that the water vapor does not condense, the reaction conditions would be such that the partial pressure of the water vapor is maintained below its vapor pressure; therefore, at typical operating conditions near room temperature, it is preferred that the partial pressure of the water vapor be maintained within a range of approximately 1–10 torr. With low levels of oxygen (a few ppm), the reaction rate is very low, and in the absence of oxygen the reaction rate is essentially zero. Flow rates and reactor design will always be such that the reactants are brought into contact with illuminated catalyst. Illuminated reactants in the absence of catalyst, and reactants that are in contact with catalyst but not illuminated by the ultraviolet light will not result in oxidation reactions as shown in FIG. 3.

The analysis of the effluent stream, to corroborate the effectiveness of the system is obtained by directing the effluent gases through a chromatographic sampling valve which contains a sampling loop in the gas chromatograph (GC). A check valve is located between the reactor and sampling loop to ensure that the high pressure carrier gas in the GC column does not flow back to the reactor, creating a pressure pulse that disturbs the catalyst and changes reaction conditions in the reactor.

This reaction scheme allows for the continuous treatment of contaminated gas streams with no catalyst/reaction product separation problems.

The treatment of volatile species via gas-solid heterogeneous photocatalysis is shown in FIG. 5 and the oxidation of all species that are initially in the gas/vapor phase will follow the same regimen. Thus, the process hereof is especially useful in cleaning gas streams of pollutants produced by the air stripping of waters containing volatile pollutants. If air stripping is the established method of volatile compound removal from the aqueous phase, the result is a volatile compound-contaminated airstream. The concentration of the pollutant in the air stream will be diluted relative to that in the water by an amount equivalent to the air/water feed ratio in the tower. The water entering and exiting the tower would be analyzed for determination of the extent and class of pollutants present and subsequent compliance with the applicable water quality guidelines, respectively. The contaminated air stream would be analyzed to determine the pollutant levels. Mixture with "clean" air could take place if needed to lower the relative humidity of the gas stream. The gas stream then would enter the photo reactor (most likely a fluidized bed) containing supported or unsupported catalyst illuminated by the ultraviolet source. Reactant/product gas transport lines should be heated to avoid adsorption (condensation) of species in the tubing or piping. After contact between catalyst/reactants/UV light has resulted in oxidation, partial oxidation or complete dehalogenation or partial dehalogenation of the polluting species, the effluent should be analyzed for gases and particulates to ensure compliance and continuing proper reactor operation. The purified air stream is then vented to the atmosphere.

Species which are normally non-volatile can be treated with this method if the pollutants can be transferred to the gas phase. One example of this is the steam regeneration of granular activated carbon (GAC) that has been used to remove organic pollutants from the aqueous phase. In this example, the contaminant-laden activated carbon column is flushed with steam (high pressure steam), producing a humid stream of contaminated air. If needed, this stream can be diluted with air to obtain optimum levels of pollutants and humidity for the reactor used. The resulting stream enters the photocatalytic reactor as described earlier. Gas stream sampling and analysis should be done after the activated carbon regeneration to determine pollutant types and levels and after the photocatalytic reactor to determine compliance and ensure no particulates have exited the reactor. Once again, piping may have to be heated to avoid adsorption on the internal surfaces.

The present invention could be used to treat any gas stream containing organic pollutants, not just streams emitted from water treatment facilities.

To further assist in the understanding of the present disclosure, and not by way of limitation, the following examples are presented.

EXAMPLE 1

Gas emissions from a solvent-based dry cleaning operation contain substantial amounts of volatile organic pollutants (despite incorporation of vapor recovery systems). The emission stream is fed into a gas-solid heterogeneous photoreactor to yield a pollutant-free stream which can be safely and legally vented to the atmosphere. Depending on the exact chemical makeup of the gas emissions from the cleaning operation, the water and oxygen content of this source is adjusted prior to introduction into the photoreactor by mixing the source with an appropriate air carrier stream of a given humidity level.

EXAMPLE 2

Gas emissions from a solvent-based tool and die cleaning operation are mixed with a water and oxygen source and then fed into a gas-solid heterogeneous photoreactor embodying the present invention. The reactor should produce a pollutant-free stream which can be safely and legally vented to the atmosphere.

EXAMPLE 3

Volatile species were extracted with the gas-solid heterogeneous photocatalysis reactor hereof by directing a gas stream of pollutants produced by the air stripping of waters containing volatile pollutants into the reactor. When air stripping is used to remove volatile compounds from the aqueous phase, the towers produce a volatile compound-contaminated airstream. The concentration of the pollutant in the air stream was diluted by an amount equivalent to the air/water feed ratio of the tower. The water entering and exiting the tower was analyzed for determination of the extent and class of pollutants present and subsequent compliance with the applicable water quality guidelines, respectively. The contaminated air stream was analyzed to determine the pollutant levels. Mixture with "clean" air is required only if needed to lower the relative humidity of the gas stream. The gas stream was then fed to the photoreactor containing supported or unsupported catalyst which was illuminated by an ultraviolet source. Reactant/product gas transport lines were heated to aid condensation of species in the system tubing. After contact between catalyst/reactants/UV light resulted in oxidation, partial oxidation or complete dehalogenation or partial dehalogenation of the polluting species, the purified air stream was then vented to the atmosphere.

EXAMPLE 4

Species which are normally non-volatile were first connected to the gas phase as in the steam regeneration of granular activated carbon (GAC) previously used to remove organic pollutants from the aqueous phase. The contaminant-laden activated carbon column was first flushed with steam (high pressure steam), producing a humid stream of contaminated air. If needed, this stream can be diluted with air to obtain optimum levels of pollutants and humidity for the reactor used. The resulting stream entered the photocatalytic reactor as before. Gas stream sampling and analysis done after the activated carbon regeneration was used to determine pollutant types and levels and after the photocatalytic reactor to determine compliance and ensure that no particulates have exited the reactor.

From the foregoing, it becomes apparent that means and methods for effectuating gas-solid photocatalytic oxidation of volatile and non-volatile organic pollutants has been herein described and illustrated which fulfill all of the aforestated objectives in a remarkably unexpected fashion. It is of course understood that such modifications, alterations and adaptations as may readily occur to an artisan having the ordinary skills to which this invention pertains are intended within the spirit of the present invention which is limited only by the scope of the claims appended hereto.

Accordingly, what is claimed is:

1. The method of removing halogenated and non-halogenated volatile and non-volatile organic contaminants from a gaseous stream comprising the steps of: mixing a gaseous oxygen bearing substance with the contaminated gaseous stream; contacting the contaminated gaseous stream and gaseous oxygen bearing substance mixture with a solid catalyst; and exposing the solid catalyst and contacted contaminated gaseous stream and gaseous oxygen bearing substance mixture to UV light having a wave length not greater than approximately 600 nm, to initiate under reaction conditions preselected to prevent formation of a liquid phase, a gas/solid photocatalytic reaction to convert said halogenated and non-halogenated organic contaminants, volatile and non-volatile, into primarily $H_2O$ and $CO_2$ and HX, where X is selected from the group consisting of chlorine, bromine and iodine.

2. A method according to claim 1 in which said gaseous stream is essentially humid air.

3. A method according to claim 1 in which said gaseous stream is water vapor.

4. A method according to claim 2 in which said UV light has a wave length of not greater than 450 nanometers.

5. A method according to claim 4 in which said UV wave length is between 300 and 400 nanometers.

6. A method according to claim 3 in which said UV light has a wave length of not greater than 450 nanometers.

7. A method of removing halogenated and non-halogenated volatile and non-volatile organic contaminants from water vapor, comprising the steps of: mixing an oxygen bearing substance with the contaminated water vapor; contacting the contaminated water vapor stream and oxygen bearing substance mixture with a solid catalyst; and exposing the solid catalyst and contacted contaminated water vapor and oxygen being substance mixture to UV light having a wave length of between 300 and 400 nanometers, to initiate under reaction conditions preselected to prevent formation of a liquid phase, a photocatalytic gas/solid reaction to convert said non-halogenated organic contaminants, volatile and non-volatile, into primarily $H_2O$ and $CO_2$, and convert said halogenated organic compounds, volatile and non-volatile, into primarily $CO_2$ and HX, where X is selected from the group consisting of chlorine, bromine and iodine.

8. A photocatalytic reactor comprising a body portion surrounding a chamber portion and having a window defined therein for passing visible light having a wave length not greater than approximately 600 nm from outside said body portion into said chamber; a catalyst bed disposed within said chamber portion and positioned to receive hereupon said light from said window and become activated in response thereto; ingress means for introducing a contaminated gaseous stream into said chamber portion for exposure to a said activated catalytic bed; first egress means for withdrawing contaminants from said chamber portion; and second egress means for withdrawing the contaminant-free gaseous stream from said chamber portion.

9. A photoreactor according to claim 8 in which said light source generates light having a wave length of at least 320 but not more than 440 nanometers.

10. A photoreactor according to claim 8 in which said catalyst is selected from the group consisting of: titanium dioxide, zirconium oxide, antimony oxide, zinc oxide, stannic oxide, cerium oxide, tungsten oxide and ferric oxide.

11. A photoreactor according to claim 8 in which said body portion is formed of borosilicate glass.

12. A photoreactor comprising a body portion surrounding a chamber portion and having a window defined therein for passing visible light from outside said body portion into said chamber; a catalyst bed disposed within said chamber portion and positioned to receive hereupon said light from said window and become activated in response thereto; ingress means for introducing a contaminated gaseous stream into said chamber portion for exposure to a said activated catalytic bed; first egress means for withdrawing contaminants from said chamber portion; second egress means for withdrawing the contaminant-free gaseous stream from said chamber portion, said photoreactor being adapted to be connected in series with a conventional water treatment system and receive and detoxify the effluent therefrom.

13. A photoreactor according to claim 9 in which said catalyst is selected from the group consisting of: titanium dioxide, zirconium oxide, antimony oxide, zinc oxide, stannic oxide, cerium oxide, tungsten oxide and ferric oxide.

14. A photoreactor according to claim 9 in which said body portion is formed of borosilicate glass.

15. A photoreactor according to claim 10 in which said body portion is formed of borosilicate glass.

16. A photocatalytic reactor comprising a body portion surrounding a chamber portion and having a window defined therein passing visible light having a wave length of at least 320 but not more than 440 nanometers from outside said body portion into said chamber; a catalyst bed disposed within said chamber portion and positioned to receive hereupon said light from said window and become activated in response thereto; ingress means for introducing a contaminated gaseous stream into said chamber portion for exposure to said activated catalytic bed; first egress means for withdrawing contaminants from said chamber portion; second egress means for withdrawing the contaminant-free gaseous stream from said chamber portion, said photoreactor being adapted to be connected in series with a conventional water treatment system and received and detoxify the effluent therefrom.

17. A photoreactor according to claim 16 in which said catalyst is selected from the group consisting of: titanium dioxide, zirconium oxide, antimony oxide, zinc oxide, stannic oxide, cerium oxide, tungsten oxide and ferric oxide.

18. A photoreactor according to claim 17 in which said body portion is formed of borosilicate glass.

19. A method according to claim 1 in which said catalyst is selected from the group consisting of: titanium dioxide, zirconium oxide, antimony oxide, zinc oxide, stannic oxide, cerium oxide, tungsten oxide and ferric oxide.

20. The method according to claim 3 comprising the step of maintaining the partial pressure of said water vapor below the vapor pressure to prevent the condensation of water vapor.

21. The method according to claim 20 comprising the step of maintaining the partial pressure of said water vapor is at a pressure of from about one to about 10 torr.

* * * * *